United States Patent [19]
Brody

[11] Patent Number: 6,131,330
[45] Date of Patent: Oct. 17, 2000

[54] METHOD FOR KILLING TERMITES

[75] Inventor: Yaakov Brody, Pikesville, Md.

[73] Assignee: Environmental Laboratories, Inc., Pikesville, Md.

[21] Appl. No.: 09/179,555

[22] Filed: Oct. 28, 1998

Related U.S. Application Data

[60] Continuation-in-part of application No. 08/683,411, Jul. 19, 1996, which is a division of application No. 08/329,907, Oct. 27, 1994, Pat. No. 5,564,222, which is a continuation-in-part of application No. 08/160,733, Dec. 3, 1993, abandoned.

[60] Provisional application No. 60/063,373, Oct. 29, 1997.

[51] Int. Cl.⁷ .................................................... A01M 1/20
[52] U.S. Cl. ............................................. 43/124; 43/132.1
[58] Field of Search ................................. 43/124, 132.1, 43/107, 131

[56] References Cited

U.S. PATENT DOCUMENTS

| | | | |
|---|---|---|---|
| 3,940,875 | 3/1976 | Basile | 43/124 |
| 4,661,157 | 4/1987 | Beauford | 106/18.13 |
| 5,152,096 | 10/1992 | Rudolph | 43/131 |
| 5,233,787 | 8/1993 | Andersen | 43/132.1 |
| 5,574,222 | 11/1996 | Brody | 43/124 |
| 5,612,046 | 3/1997 | Chin et al. | 424/405 |

OTHER PUBLICATIONS

"Tim–Bor® Insecticide", U.S.B. & C.C. 1992 and 1993.
Noirot, "Borates And Termite Control", U. S. Borax Research Corporation, 1992, pp. 1–4.

*Primary Examiner*—Jack W. Lavinder
*Attorney, Agent, or Firm*—Leydig, Voit & Mayer, Ltd.

[57] ABSTRACT

A method for poisoning of termites without poisoning the soil by displacing a solid unitary article, such as, a stone or patio block, placing a thin cellulose body impregnated with a borate salt in contact with the soil exposed by displacing the article and restoring the article to its original position wherein the cellulose body is covered by the article. The cellulose bodies are perferably impregnated with a sodium borate salt, such as disodium octaborate tetrahydrate or disodium tetraborate decahydrate.

8 Claims, 1 Drawing Sheet

METHOD FOR KILLING TERMITES

This application claims benefit of Provisiional Appln. 60,063,373 filed Oct. 29, 1997.

This disclosure is a continuation-in-part of U.S. patent application Ser. No. 08/683,411, filed Jul. 19, 1996 still pending which is a division of U.S. Pat. Ser. No. 08/329,907 filed Oct. 27, 1994, now U.S. Pat. No. 5,564,222, which is a continuation-in-part of U.S. patent application Ser. No. 08/160,733, filed Dec. 3, 1993, abandoned. These prior disclosures are incorporated by reference in the following disclosure.

FIELD OF THE INVENTION

The present invention relates to articles useful in attracting and poisoning termites.

BACKGROUND OF THE INVENTION

Termites are well known throughout most areas of the world. These insects that attack and destroy wooden structures are classified into four principal categories, i.e., subterranean, formosan, damp wood, and dry wood. The invention is particularly directed to poisoning of subterranean, damp wood, and formosan termites. (Dry wood termites live in wood with relatively small moisture content in particular areas of the world and are not present in the soil.) Many methods for killing termites have been practiced over the years. Frequently, some termite-killing chemical is applied to the soil in the vicinity of a structure that is to be protected from termites. Many of the termiticides that have been used have lasted in the soil for a long time and do not break down into innocuous residues. An example of such a long-lasting chemical that has been used for many years is chlordane. However, chlordane and other halogenated insecticides, such as DDT, aldrin, dieldrin, and heptachlor have harmful effects. The residues of these chlorinated insecticides remain in the soil for very long periods of time and it is known or believed that some of these insecticides are dangerous to humans and higher life forms including other mammals. Because of these environmental hazards, use of many of these insecticides has been severely limited or prohibited. Typically, these insecticides are applied directly to the soil near a structure to be protected, forming a subterranean "curtain" or barrier that kills termites that attempt to pass through the barrier. These insecticides not only are hazardous because of their long lifetime and the nature of the residues they leave but are also hazardous to the persons involved in the manufacture and application of the insecticides to the soil.

SUMMARY OF THE INVENTION

Since termites cannot be eliminated, it is desirable to provide a simple article that can eradicate termite colonies without poisoning the soil or introducing elements into the soil that present an unreasonable health hazard. Further, it is desirable that the article be utilitarian and that its termite killing potential be renewable.

In one aspect of the invention, termites are poisoned by placing on the soil articles including a hollow shell of a long lived material, each shell having a recess receiving a cellulose body impregnated with a borate salt. Alternatively, an area subject to termite infestation or already infested may be surrounded by the articles to prevent invasion by termites or to prevent escape of termites.

According to another of the invention, the articles may include a masonry shell, such as stone or concrete, or a plastic or synthetic material including fiberglass, and may resemble and be used as stepping stones, patio blocks, or building blocks. The cellulose body may be a block of wood, paper, cardboard, compressed cellulose, or another composite material that termites eat.

In yet another aspect of the invention, a stepping stone, patio block, or another like masonry, stone, plastic, or synthetic article in contact with the ground is displaced temporarily and a relatively thin cellulose body impregnated with the boron salt is placed in contact with the soil. Then, the stepping stone, patio block, or like article is restored to its previous position so that the cellulose body is disposed between the article and the soil for killing foraging termites.

According to yet another aspect of the invention, a relatively thin cellulose body impregnated with a boron salt is provided for placement between the soil and a removable stepping stone, patio block, or like masonry, stone, plastic, or synthetic article, in contact with the soil, for attracting and killing termites. The cellulose body may be wood, paper, cardboard, compressed cellulose, or another composite material that termites. Preferably, the cellulose body has a shape so that it is completely obscured from view by the stepping stone, patio block, or like article.

BRIEF DESCRIPTION OF THE DRAWINGS

Like elements are given the same reference numbers in all figures.

DETAILED DESCRIPTION OF PREFERRED EMBODIMENTS

In order to avoid poisoning of the soil in using a method for killing termites, a termiticide must be chosen carefully. Preferred termiticides that do not poison the soil are borate salts. Boron is widely present in the environment and is a nutrient for plant life. Boron appears naturally in fruits and vegetables and is consumed by most humans in small amounts every day. In other words, borate salts are good choices for termiticides because of their low mammalian toxicity.

Borate salts are well known as termiticides. For example, $Na_2B_8O_{13} \cdot 4H_2O$ (disodium octaborate tetrahydrate) is presently being sold as a termiticide by U. S. Borax Inc. of Los Angeles, Calif. under the registered trademark TIMBOR. $Na_2B_4O_7 \cdot 10H_2O$ (disodium tetraborate decahydrate) is also known to be an effective termiticide. These sodium borate salts have acceptable degrees of solubility in water for use in the present invention. It is believed that borate salts are slow acting termiticides that kill protozoa living within the gut of termites. These protozoa are essential to the digestion of cellulose. Thus, when a termite ingests the borate salt, it does not die instantly but gradually starves as the protozoa die and the termite no longer is nourished by ingested cellulose.

In their social organization, a certain class of termites forage for food to feed other classes of termites in the society. When the foraging termites return to a colony and feed the ingested, slow-acting borate salt to nymphs, soldiers, and the termite queen, those other termites are also poisoned. The termiticide may also be spread when poisoned termites die and are cannibalized. Gradually, an entire colony can be decimated by feeding on a borate salt, directly or indirectly.

Since borate salts are well recognized as effective, slow-acting termiticides, some means must be provided for supplying the termiticide to foraging termites. The foraging termites seek cellulose as food, for example, by burrowing through soil or through debris or materials covering soil, such as dead or decaying vegetation, including burrowing through soil next to solid objects, such as stepping stones, patio blocks, and like objects.

In one aspect of the invention, a cellulose body impregnated with a borate salt is placed in a recess of a shell of a long lasting material as a termite killing article. The articles are placed on the soil, possibly near a termite infestation, or near a feature, such as a tree stump, likely to attract termites. The articles are placed so that the cellulose body contacts the soil with the shell exposed to view. Foraging termites burrowing through the soil eat the cellulose, thereby ingesting the termiticide and carrying it back to the termite colony.

Figure 1:
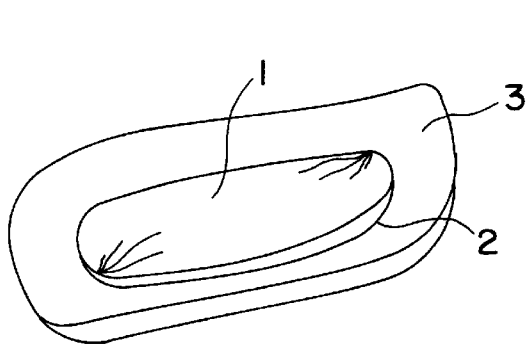
FIG. 1 is a perspective, bottom view of an embodiment of the invention.

A perspective view, from the bottom, of an embodiment of the invention is shown in FIG. 1. In this embodiment, the cellulose body for supplying the borate salt to termites is a wood block. The block 1 is received in a recess 2 of a shell 3 made of a long lasting material that is generally impervious to weather. This block 1 is shown protruding from the shell to ensure soil contact. However, the block may be flush with the bottom surface of the shell or even somewhat recessed. The article of FIG. 1 is suitable for use as a stepping stone. The shell 3 may resemble and be used as a conventional stepping stone or a patio block, an ornamental rock made of stone, concrete, fiberglass, plastic, or another synthetic material, such as fiberglass, or any other like article.

Figure 2A:
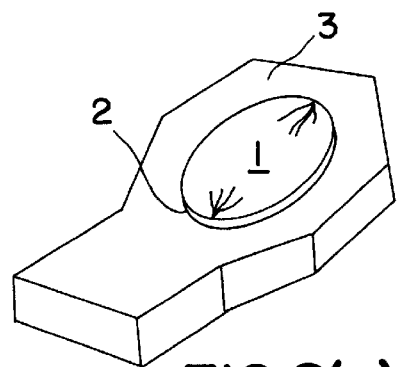
FIGS. 2(a), 2(b), and 2(c) show bottom views of examples of shells with recesses according to the invention.
Figure 2B:
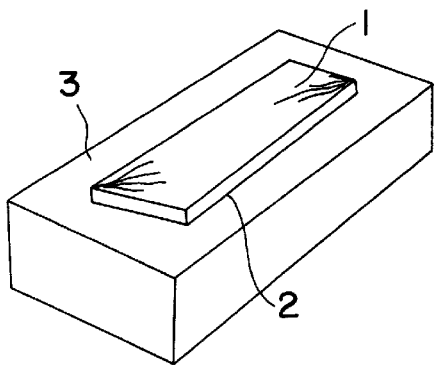
Figure 2C:
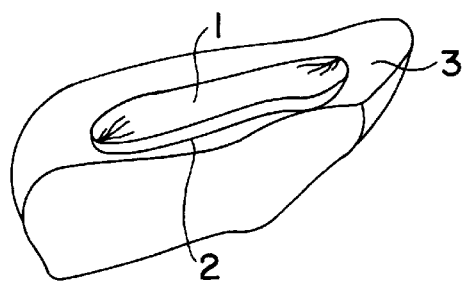

The shell 3 may have any shape convenient to use, such as shown in FIGS. 2(a), 2(b) and 2(c), that is acceptable in appearance. FIG. 2(a) shows an example of an interlocking paver, FIG. 2(b) shows a non-interlocking patio or building brick, and FIG. 2(c) shows a field stone used in a wall, all in accordance with embodiments of the invention. The recess 2 is located in the surface of the shell that contacts the soil so that the cellulose body can be positioned for attack by subterranean termites.

The cellulose body need not be the wooden block 1. Any solid form of cellulose impregnated with a borate salt is satisfactory. The body may be paper or cardboard, particularly in a laminated form, compressed sawdust or wood chips, or the like so long as the body is mechanically stable and absorbent so that it takes up the borate salt from a solution when sprayed or immersed. Preferably, an unused cellulose body fits frictionally within the recess 2 to facilitate its installation and so that the body does not fall out of the recess when the article is oriented for placement on the ground. When the cellulose body is paper, it can be crumpled and inserted into the recess so that it is held frictionally within the recess. Similarly, a cardboard insert can be bent at its edges to engage the surface of the recess.

Since a termite burrowing through the soil reaches the cellulose body and ingests the cellulose, the termite action gradually erodes the cellulose body. The effectiveness of the body may also decline over time by the leaching of the borate salt. In the invention, the efficacy of the article may be continually restored by turning over the article, removing any remaining part of a cellulose body earlier installed in the recess and installing a fresh cellulose body impregnated with a borate salt. The shell 3 is then restored to its original position on the soil for further poisoning of termites.

Any appropriate borate salt can be employed to impregnate the cellulose body, such as disodium octaborate tetrahydrate or disodium tetraborate decahydrate. An aqueous solution of the salt is prepared and the cellulose body is immersed in the solution for a sufficient time for the solution to be absorbed by the cellulose body. Soaking of cellulose bodies in a borate salt solution of at least 0.5 weight percent concentration and up to 20 weight percent concentration is preferred. The percentage of the borate salt in the cellulose body may vary. If the concentration is too high, termites may be repelled and not eat the cellulose. If the concentration is too low, loss of the borate salt into the adjacent soil from the cellulose body may exhaust the effective supply of the salt prematurely. In order to improve the wetting of cellulose and absorption of the solution by the cellulose, a surfactant may be added to the aqueous solution. Among the surfactants that assist in wetting cellulose bodies are soaps, detergents, floatation agents, and ethylene glycol. All of these surfactants lower the surface tension of the water in the solution. In order to increase the speed with which the salt is taken up by a cellulose body, a pressure exceeding one atmosphere may be applied to the surface of the solution containing cellulose bodies being impregnated with the borate salt.

The articles including the cellulose bodies impregnated with a borate salt can be placed on the soil in various ways. Depending upon the shapes and surfaces of the articles, a structure of pleasing appearance can be assembled with the articles. If termites are present, the termites preferentially consume the cellulose article containing the borate salt and carry the borate salt or its byproducts to other termites in their colony so that all termites in the colony are ultimately killed. In this application, the borate salt is not a bait that attracts termites and kills them immediately. The cellulose attracts the termites. The termites carry the borate salt back to the colony where the lethal poisoning occurs.

Preferably, the articles are spaced apart at regular intervals from neighboring articles. The articles can be quickly and efficiently installed to rid an area of termites.

In addition, the articles so arranged may be utilitarian, providing a patio, walkway, garden wall or like structure. It is sufficient if some of the articles arranged in a pattern include a cellulose body while other articles similar in appearance do not include a recess or cellulose body. For example, in a patio, only blocks at intersections of a grid may be articles according to the invention while the other blocks in the patio have a similar or complementary appearance but lack the recess and/or cellulose body. Likewise, every block or stone in a walkway including articles according to the invention need not include the recess and/or cellulose body. Preferably the articles, whether made of stone, a cast material such as concrete, plastic, or fiberglass, have an attractive appearance that does not reveal their function. The articles may have irregular, polygonal, or interlocking shapes depending upon their intended aesthetic and utilitarian use.

While the articles including recesses are particularly useful in controlling termites, the invention may also be employed with stepping stones, patio blocks, and like masonry, stone, plastic or synthetic articles that are in contact with the soil and that can be temporarily displaced from their positions.

Figure 3A:
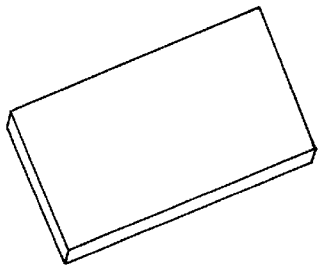
FIGS. 3(a), 3(b), and 3(c) show perspective view of examples of cellulose bodies according to the invention.
Figure 3B:
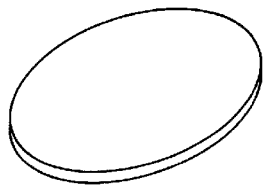
Figure 3C:
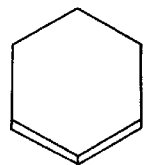

The articles need not include recesses in order to interpose a cellulose body between and in contact with the soil and the article. For example, the cellulose body may be a relatively thin body impregnated with a boron salt for placement between the soil and the removable article. For example, wood, paper, laminated paper, cardboard, compressed cellulose, or a composite attracting termites can be formed in any shape, as shown in the examples of FIGS. 3(a), 3(b), and 3(c) that can be placed between and in contact with an article and the soil. Most preferably, the cellulose body is not visible once the article has been replaced in its original position. It is preferable that the cellulose body be relatively thin so that upon restoration of the article to its original position, the article does not protrude or become uneven with other adjacent, like articles. Some soil may be removed from beneath the article for receiving the cellulose body.

In practical use, the stepping stone, patio block, or like masonry, stone, plastic, or synthetic article in contact with the soil is displaced so that the soil beneath the article is exposed. Then, the cellulose body is placed on and in contact with the soil and the article is restored to its original position, obscuring from view the cellulose body. From time to time, the article is displaced to inspect the cellulose body. When the cellulose body has been sufficiently eroded by termites or natural deterioration, it is either removed and replaced or an additional cellulose body is installed. The cellulose body need have no particular shape but preferably has a configuration that is obscured from view when the article is restored to its original position.

The borate salt may leach from the cellulose bodies and/or dissolve in moisture and spread through the soil. The result is a "curtain" of termiticide that can be ingested by termites even if the cellulose bodies are not directly attacked. Because of the very low or non-existent mammalian toxicity of the borate salt, spreading of termite colonies, and attraction of termites can be prevented by the invention without poisoning the soil by introducing a toxic material or leaving undesirable residues. In addition, the cellulose articles can be prepared and used without health risks to the workers manufacturing and installing them.

The invention has been described with respect to certain specific embodiments. However, additions and modifications within the spirit of the invention will occur to those of skill in the art from the foregoing description. Accordingly, the invention is defined solely by the following claims, including all equivalents thereof.

I claim:

1. A method for poisoning termites without poisoning soil comprising:

displacing a solid unitary article in contact with soil, thereby exposing the soil;

placing a thin cellulose body impregnated with a boron salt in contact with the soil exposed by displacement of the article; and restoring the article to approximately its original position.

2. The method of claim 1 wherein the thin cellulose body is selected from the group consisting of wood, paper, and laminated paper.

3. The method of claim 1 wherein the borate salt is a sodium borate salt.

4. The method of claim 1 wherein the article is made of at least one material selected from the group consisting of stone and concrete.

5. The method of claim 1 wherein the article is made of at least one material selected from the group consisting of plastic and fiberglass.

6. The method of claim 1 wherein the article is a stepping stone.

7. The method of claim 1 wherein the article is a patio block.

8. The method of claim 1 including placing the cellulose body and restoring the article so that the cellulose body is obscured from view by the article.

* * * * *